United States Patent
Dounoucos

[15] 3,674,022
[45] July 4, 1972

[54] INTEGRATED SYSTEM FOR GENERATING OXYGEN AND CONTROLLING CARBON DIOXIDE CONCENTRATION IN CLOSED CIRCUIT BREATHING APPARATUS

[72] Inventor: Angelo Dounoucos, Schenectady, N.Y.
[73] Assignee: General Electric Company
[22] Filed: Aug. 31, 1967
[21] Appl. No.: 664,875

[52] U.S. Cl. .................................................128/142
[51] Int. Cl. .................................................A62b 7/02
[58] Field of Search ................128/142, 142.3, 142.6, 146.5

[56] References Cited

UNITED STATES PATENTS 3,403,612  10/1968  Swef et al. ..........................128/142

*Primary Examiner*—Verlin R. Pendegrass
*Attorney*—Richard R. Brainard, Paul A. Frank, Charles T. Watts, Leo I. Ma Lossi, Frank L. Neuhauser, Oscar B. Waddell and Melvin M. Goldenberg

[57] ABSTRACT

A particularly effective permselective membrane gas separation device employing an immobilized liquid film, which must be retained in damp condition, is coupled with a solid polymer electrolyte fuel cell apparatus to which electrical energy and moist air are supplied. The fuel cell preferentially transports essentially pure oxygen across the solid electrolyte for ultimate, or immediate, use in a closed circuit breathing system as the make-up oxygen gas for purified exhaled air, which has been circulated over one side of the permselective liquid membrane area of the gas separation device. Moist gaseous exhaust of controlled relative humidity from the cell is used to "scrub" and dampen the opposite side of this same permselective liquid membrane area optimizing the performance and, in the case of un-encased liquid membranes, extending the useful life thereof and thereby eliminating the need for a separate humidifying device.

8 Claims, 5 Drawing Figures

Inventor:
Angelo Dounoucos,
by [signature]
His Attorney.

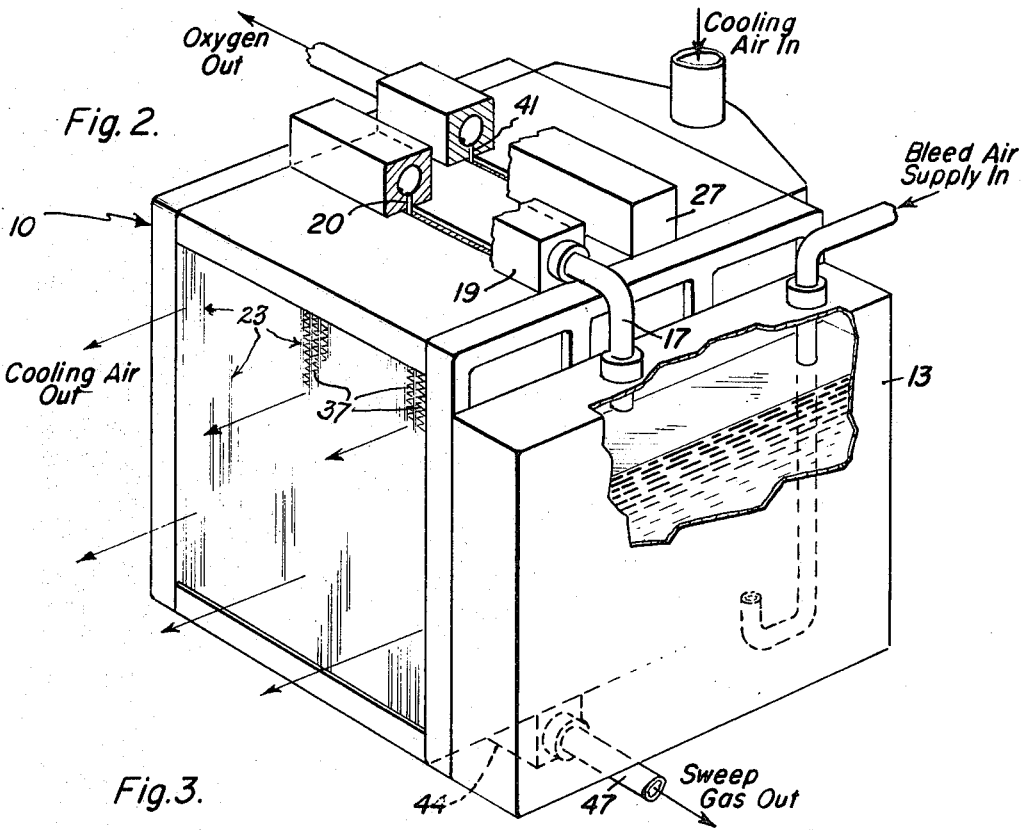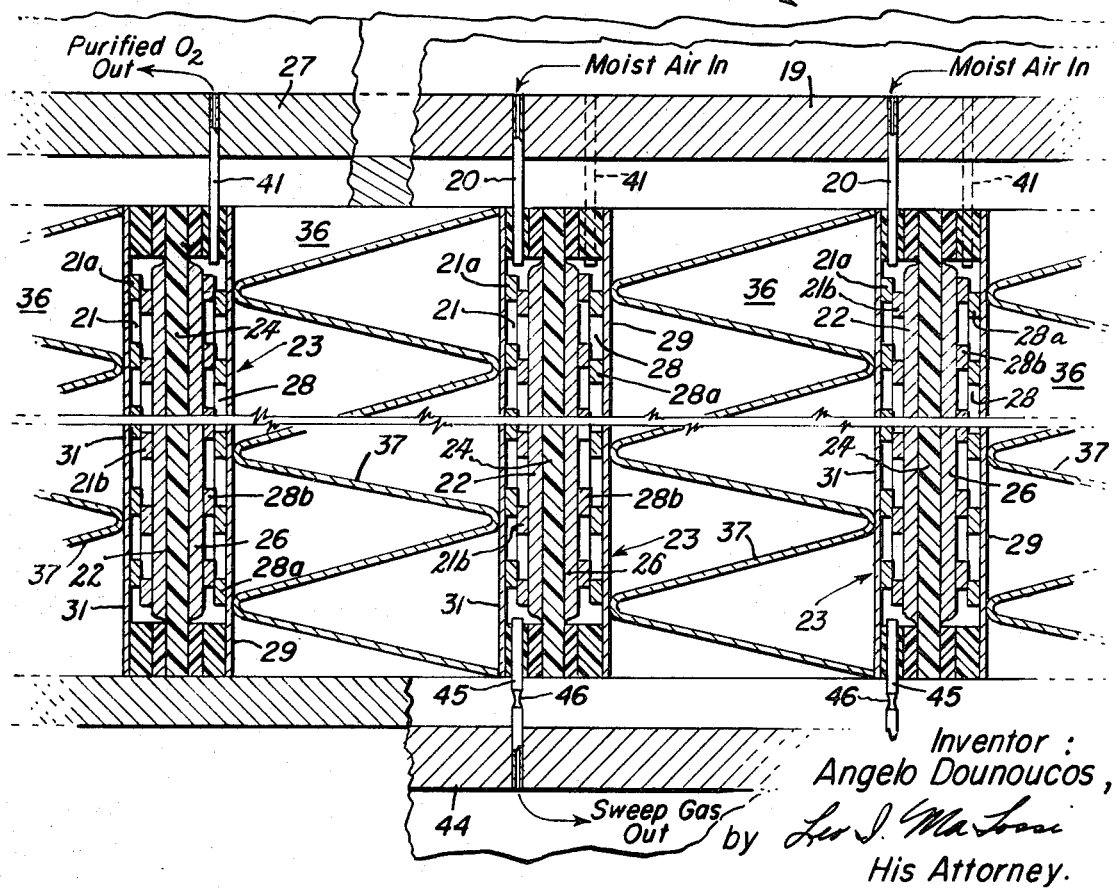

Inventor:
Angelo Dounoucos,
by [signature]
His Attorney.

INTEGRATED SYSTEM FOR GENERATING OXYGEN AND CONTROLLING CARBON DIOXIDE CONCENTRATION IN CLOSED CIRCUIT BREATHING APPARATUS

BACKGROUND OF THE INVENTION

A system for the distribution of oxygen to, and removal of exhaled gases from, one or more respirators is disclosed in U.S. Pat. application Ser. No. 615,582—Dibelius and Dounoucos, filed Feb. 13, 1967, now U.S. Pat. No. 3,489,144 and assigned to the assignee of the instant invention. In this system a device having extensive permeable, non-porous wall area is employed to reduce the content of carbon dioxide in the exhaled gases which gases are then recycled. More specifically, the novel device (referred to as a "rebreather unit") is introduced into a closed breathing system in order that exhaled gases leaving the respirator may enter the rebreather unit and be purged to diminish the carbon dioxide content thereof below a safe level. After being purged, these exhaled gases still contain a high percentage of oxygen and are returned to the breathing system to be up-graded with make-up oxygen for eventual readmission to the respirator.

The function of the rebreather unit is made possible by the availability and use of permselective membranes having an absolute permeability to carbon dioxide in excess of about $$200 \times 10^{-9} \frac{cc. \ (NTP) - cm.}{sec. - cm.^2 - cm. \ Hg \ \Delta P}$$

(NTP being the abbreviation for "normal temperature and pressure") and a carbon dioxide to oxygen permeability ratio (permeability to $CO_2$ divided by the permeability $O_2$) greater than 5:1. One particularly effective permselective membrane disclosed in U.S. application Ser. No. 572,222—Ward et al., filed Aug. 15, 1966, now U.S. Pat. No. 3,396,510 and assigned to the assignee of the instant application, is the modified cellulosic ester membrane containing immobilized liquid, a specific example of which is cellulose acetate film impregnated with an aqueous solution of alkali bicarbonate, as for example, cesium bicarbonate. A second immobilized liquid membrane structure disclosed in U.S. application Ser. No. 657,944—Dounoucos, filed Aug. 2, 1967, now U.S. Pat. No. 3,447,286 and assigned to the assignee of the instant application combines much of the permselective performance of the above membrane structure while totally enclosing the liquid film to increase its longevity and enabling rejuvenation thereof in the event of drying out.

Unfortunately, modified cellulosic ester liquid impregnated films must be kept at a relative humidity of about 70 percent in order to insure that these membrane do not dry out whereupon they become useless. Although the totally enclosed liquid membrane can be rejuvenated after having been allowed to dry out, this type of liquid membrane should also be kept in an ambient of about 70 percent relative humidity for optimum performance. Therefore, in those closed breathing systems wherein weight considerations are of prime importance, as is the case with breathing systems for high flying aircraft, it is often impractical to employ such immobilized liquid films in the rebreather unit, because of the weight penalty imposed by humidifier equipment to maintain the requisite condition of approximately 70 percent relative humidity for the film. In such applications, it becomes necessary to employ solid permselective membranes, such as silicone rubber, which does not require the maintenance of specific humidity conditions, but which does have the relative diSadvantage of lower $CO_2/O_2$ permeability ratios.

The preparation of modified cellulosic ester films is described in U.S. Pat. No. 3,133,132—Loeb et al. and U.S. Pat. No. 3,133,137—Loeb et al., each of which employs these membranes to achieve the phenomenon known as "reverse osmosis," rather than for selective gas separation. The preparation and properties of such membranes as set forth therein and in the aforementioned Ward et al. application are incorporated by reference. The preparation and properties of totally enclosed liquid films as described in the aforementioned Dounoucos application Ser. No. 657,944 are also incorporated by reference.

As is indicated in the aforementioned application Ser. No. 615,582 the make-up oxygen may be carried along as a contained oxygen supply or may be supplied on the site by an oxygen generator. Means, such as a blower, is provided to circulate the ambient gaseous atmosphere over the surface of the permselective membrane to "scrub" any accumulation of gas immediately adjacent the membrane surface to maintain the requisite difference in partial pressure of carbon dioxide gas.

An article in Frontiers in Fuel Cells, Volume 4, No. 1, August 1965—published by Venture-Tech, Inc., 825 Westwood Drive, Ballwin, Mo., describes the generation of pure oxygen by the use of a fuel cell battery operated in reverse. The solid electrolyte used in the high-temperature fuel cell described therein is a ceramic material composed mainly of zirconia. At the operating temperature of the cell (about 1,800° F) carbon dioxide and water vapor (waste products given off as impurities by the lungs) are supplied to the cell and decompose releasing oxygen ions at the negative cell terminal, when the fuel cell battery is operated in reverse by supplying electric power thereto. Hydrogen gas and solid carbon are produced in addition to pure oxygen.

In addition, a fuel cell for the production of purified gases employing appropriate cation or anion exchange resin solid polymer membranes as the electrolyte is disclosed in U.S. application Ser. No. 385,925—Maget, filed July 29, 1964 now U.S. Pat. No. 3,489,670 and assigned to the assignee of the instant application. This fuel cell structure may be operated at about room temperature for the production of such purified gases as hydrogen or oxygen by the supply of electrical energy and impure hydrogen or oxygen at the electrodes. If a cation exchange membrane is employed in the purification of oxygen, water must be supplied at the anode and, if an anion exchange resin is employed, water must be supplied at the cathode. Thus, in either case water is required for the operation of the fuel cell operated in reverse as an oxygen concentration cell.

In summary, therefore, a device (rebreather unit) has been disclosed for refurbishing exhaled gas mixtures, which has a high degree of reliability and markedly reduces the maintenance required for closed circuit breathing systems. The most effective permselective membrane for such a rebreather unit, is of the immobilized liquid film type, which however may advantageously be employed in the rebreather unit only, if it can be kept damp as by some sort of humidifier device. Also, various oxygen concentration cells (fuel cells operated in reverse) have been disclosed. In one type, pure oxygen is produced from respiratory waste products and in another type oxygen is simply selectively removed from an oxygen-containing mixture of gases.

SUMMARY OF THE INVENTION

In accordance with the instant invention certain aspects of the operation of a solid electrolyte, ion-exchange membrane type of oxygen concentrator cell are made to uniquely complement the operative requirements in a closed circuit breathing apparatus of a rebreather unit employing a highly efficient immobilized liquid film.

Thus, in accordance with the instant invention exhaled air from the respirator may be conducted to a rebreather unit wherein, because of the immobilized liquid membrane, a ratio of selectivity of carbon dioxide gas passage compared to oxygen gas passage of greater than 1,500:1 prevails. Make-up oxygen for addition to the revitalized gases is generated by the use of an ion-exchange membrane type oxygen concentrator cell with the simultaneous output of a pressurized gas exhaust therefrom low in oxygen, but high in water content. Instead of discarding this pressurized gas flow, additional cooperation between this particular type of oxygen concentrator cell and the rebreather unit with its immobilized liquid membrane is advantageously induced by pre-setting the pressure (and thereby the relative humidity) of the pressurized exhaust gas flow and then utilizing this exhaust gas to scrub one side of the liquid membrane and continually supply moisture thereto, and simultaneously to dehumidify the exhaled gases on the opposite side of the liquid membrane (relative humidity greater than 90 percent).

BRIEF DESCRIPTION OF DRAWING

Other objects, features and advantages of the invention will become evident from the following detailed description of the preferred embodiment referring to the drawings in which:

FIG. 2 is an isometric view partially cut away showing the construction of the oxygen concentrator cell;

FIG. 3 is an enlarged schematic representation of a single one of the concentrator cells employed in the oxygen concentrator cell of FIG. 2;

DESCRIPTION OF THE PREFERRED EMBODIMENT

Figure 1:
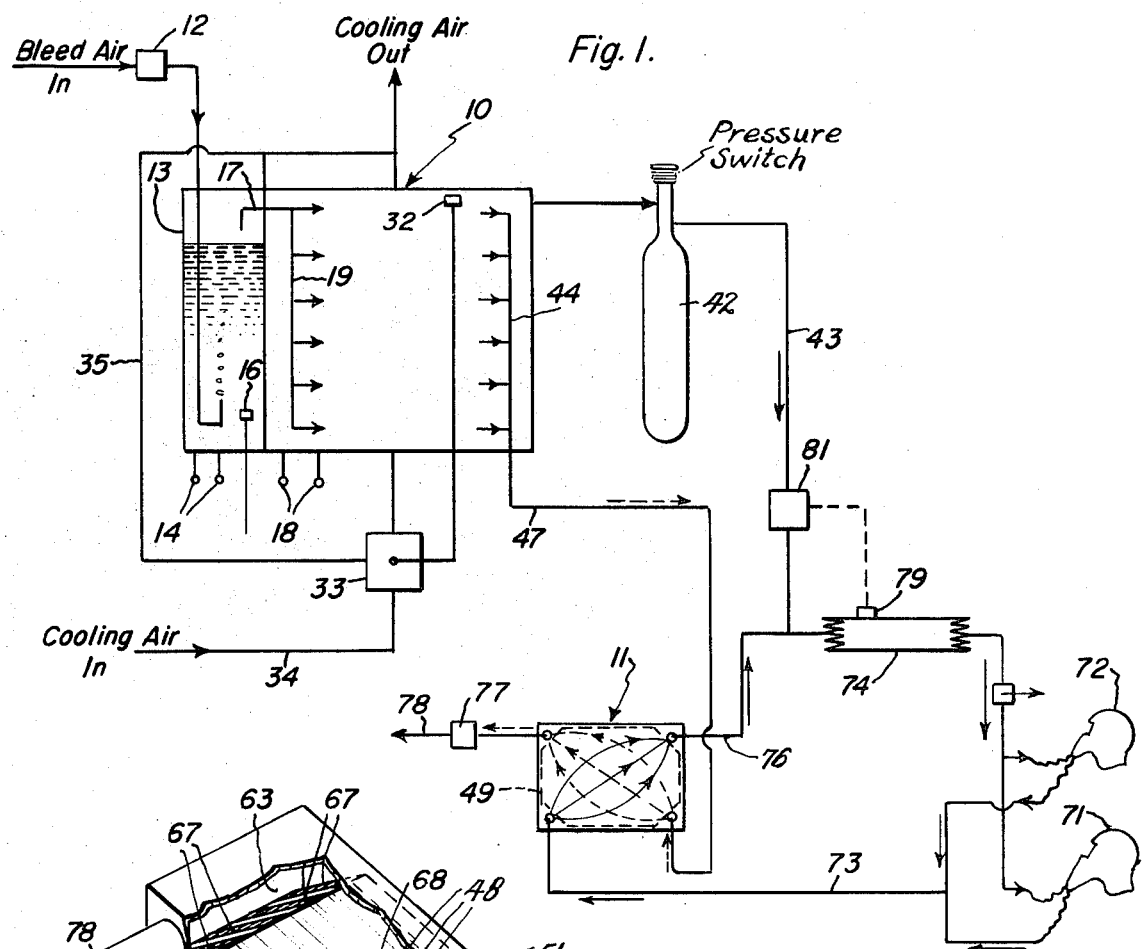
FIG. 1 is a schematic systems diagram showing an interconnection of components in accordance with the instant invention.

Referring now to FIG. 1, the apparatus shown comprises generally the oxygen concentrator 10 and the membrane rebreather 11, the latter being connected into the closed circuit breathing system. Although the input air for oxygen concentrator 10 could otherwise be obtained this description has been related to an aircraft and the input air is, therefore, compressor bleed air available at a minimum pressure of about 40 psig from the aircraft gas turbine. This input air under pressure is introduced through the input pressure regulating solenoid valve 12 to a humidifier 13 containing water maintained at a temperature approximately 10° C. above the temperature of the adjacent oxygen concentrator 10. The requisite water temperature is maintained by electric heater 14 controlled by thermostat 16. The air becomes fully saturated with water vapor (which is required for the operation of cell 10) before entering cell 10 via conduit 17 shown in FIG. 2. Electrical energy is supplied to the cell electrodes via terminals 18 and the incoming humidified air flows under pressure from manifold 19 via passages 20 to screens 21, one of which is located adjacent the cathode 22 of each single cell 23. Screens 21 consist of two overlapping but offset, flat sheets 21a and 21b of expanded metal permitting free flow of the reactants and product and also forming part of the conductive path for electron flow through the stack of cells 23.

Using a cation exchange membrane as the solid electrolyte 24 between each cathode 22 and each anode 26, hydrogen ions are conducted through the membrane 24 from the oxygen-output side (anode) to the oxygen-input side (cathode) of each individual cell, while water migrates in the opposite direction through the electrolyte 24 under a concentration gradient imposed by the consumption of water at the anode. If desired, the structural arrangement shown herein can be modified to provide flooding of the anode chamber with water, the $O_2$ produced bubbling out therethrough. The cell reactions are as follows:

At the cathode
$$\tfrac{1}{2}O_2 + 2H^+ + 2e^- \rightarrow H_2O$$
At the anode $H_2O \rightarrow \tfrac{1}{2}O_2 + 2H^+ + 2e^-$.

The use of a cation exchange resin as the solid electrolyte for the oxygen concentrator is particularly advantageous in that the transfer of carbon dioxide to the output side is minimal.

If, instead of the cation exchange resin, an anion exchange resin were to be utilized for the oxygen concentration, hydroxyl radicals would be the transported material and the reactions would be as follows:

At the cathode
$$O_2 + 2H_2O + 4e^- \rightarrow 4OH^-$$
At the anode $4OH^- \rightarrow O_2 + 2H_2O + 4e^-$.

Oxygen liberated at the anodes 26 passes to manifold 27 via screens 28 (flat expanded metal sheets 28a, 28b) being restricted to the anode compartment by the presence of the thin metal wall 29. A similar wall 31 defines the cathode compartment of cell 23 being in closed contact with flat sheet 21a.

The heat generated within each cell 23 must be dissipated in order to maintain the desired (50°–100° F) cell operating temperature. Cell temperature sensor 32 controls the operation of air bypass valve 33 whereby cooling air from air inlet pipe 34 either bypasses oxygen concentrator 10 via conduit 35 or enters oxygen concentrator 10 for passage through cooling passages 36 defined by the flat thin metal walls 29, 31 and subdivided by the sinuous solid thin metal wall, or fin, 37. Both the anode and cathode compartment volumes and the flat expanded metal sheets 21a,b and 28a,b are in heat transfer relationship to the cooling passages 36 via metal walls 29, 31 and 37.

The ion exchange material used as the solid electrolyte 24 may consist of any of the well-known cation or anion exchange membranes. For example, cation exchange membranes formed of materials such as phenol aldehyde sulfonic acid, polystyrene-divinylbenzene sulfonic acid, phenol aldehyde carboxylic acid, trifluorostyrene sulfonic acid and perfluorocarbon sulfonic acid may be employed. Among the anion exchange materials, which may be utilized, are quaternized chloromethylated polystyrene and aminated chloromethylated polystyrene. The thickness of the membranes employed in the practice of this invention is not critical and may vary from several mils to a quarter of an inch or more. However, for both weight and economic considerations, the membranes are preferably kept as thin as possible, for example, from about 20 to 30 mils.

A number of different types of electrodes are suitable for use in the cells of the present invention. Such electrodes should be conductors, should be capable of absorbing the gas to be treated, and should act as catalysts for the electrode reaction. Suitable electrodes which meet these requirements are well-known and many have been described in the literature. For example, a number of suitable electrodes are set forth in "Catalysis Inorganic and Organic," Berkman, Morrel, and Egloff, Reinhold Publishing Co., New York (1940). Suitable electrode materials include metals of Group VIII of the Periodic Table such as rhodium, palladium, iridium, and platinum. Other suitable metals include nickel and copper. In addition to these materials, the electrodes can be formed of platinum black (or palladium black) deposited on a base metal such as stainless steel, iron, nickel, and the like. In addition, suitable electrodes can be formed from metal oxides, or from carbon activated with platinum or palladium, or with oxides of iron, magnesium, cobalt, etc. These electrode materials may be used in sheet form, or in the form of screens, meshes, or other types of porous bodies. The thickness of the electrode is not critical, sizes of from 1 mil up to one-fourth inch or more having been operated satisfactorily as electrodes. Additionally, the electrodes can be formed of asperitied alloys containing a noble metal, titanium, and a material such as tantalum.

The solid ion exchange electrolyte materials mentioned in conjunction with the present invention all have gas permeabilities on the order of $$10^{-5} \text{ to } 10^{-9} \ \frac{\text{cc. NTP} - \text{cm.}}{\text{sec.} - \text{cm.}^2 - \text{cm. Hg} \Delta P}.$$

These permeation rates may be appreciably improved by the application of a potential across the ionic barrier, that is between the electrodes adjacent and in electrical contact with the electrolyte, such as electrodes 22 and 26. The transfer rate of the gas is essentially proportional to the applied potential across the cathode and anode up to potentials at which the electrolyte would be dissociated.

The oxygen output from oxygen concentrator 10 leaves via conduit 41 at a pressure considerably increased over the pressure of the input air (90 psig or higher compared to the initial 40 psig) with the amount of compression being limited only by the electrical potential applied to cell terminals 18, which in turn must be less than the value of the maximum allowable electrical potential short of causing dissociation of the electrolyte, and by the pressure gradient (which may be as high as 200–300 psi) which the particular membrane can withstand.

Because of the increased pressure of the essentially pure oxygen so produced, it may be conveniently introduced to and retained in oxygen storage tank 42 ready for release on demand via conduit 43 to enter the closed circuit breathing system.

The exhaust air of depleted oxygen content containing only about 10 percent oxygen exiting from the cathode compartment is conducted to manifold 44 via passages 45. Each passage 45 contains throttling means 46 to allow the downstream pressure to drop to about 20 psig. This exhaust air is then conducted via conduit 47 to a rebreather unit 11, where it flows between and serves to sweep over and scrub stagnant gas layers from the opposing faces of adjacent spaced parallel layers of immobilized liquid membranes 48 and to simultaneously maintain these membranes 48 at a relative humidity of about 70 per cent (between 65 and 75 percent relative humidity) to prevent drying thereof, which drying would result in the destruction of these films. Also, since the immobilized liquid membrane is extremely permeable to water vapor, the relative humidity (over 90 percent) of the exhaled breath is very rapidly reduced to the level of the relative humidity of the scrubbing flow.

Figure 4:
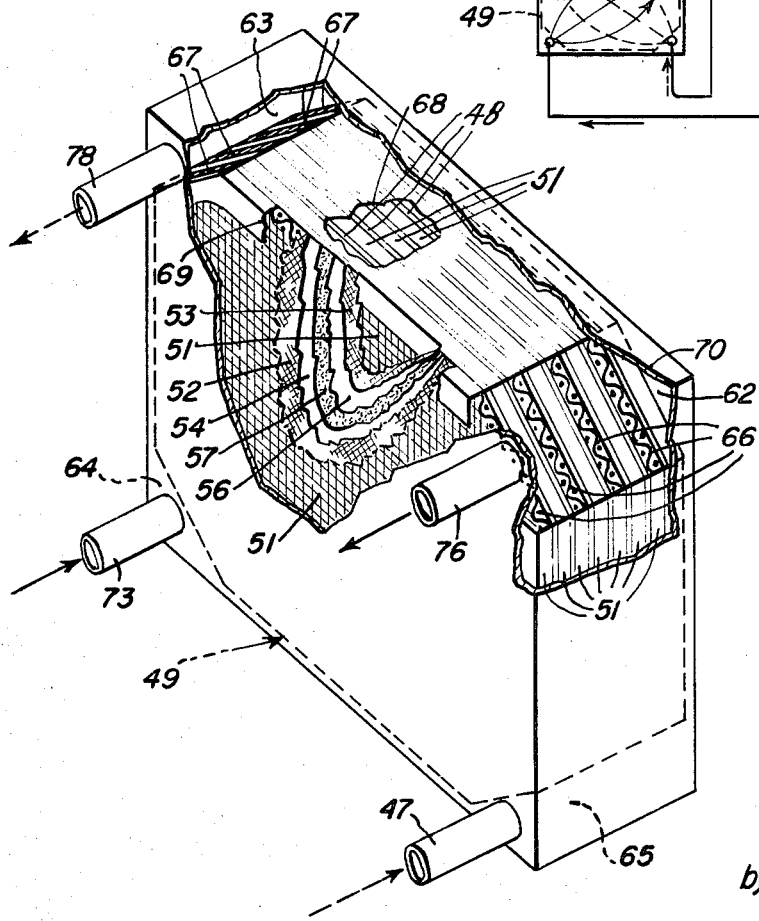
FIG. 4 is a perspective view partially cut away of a rebreather unit embodying parallel, spaced immobilized liquid membranes, the spacing thereof being accomplished with screens (solid and dotted arrows indicating the flows in the breathing circuit and the sweep gas circuit, respectively correspond to these same arrow designations in FIG. 1)

As may be seen in FIG. 4 a membrane package 49 is enclosed in a housing 50 made of plastic material or metal depending on the pressure of the sweeping gas. Membrane package 49 is composed of alternate layers of separator screens 51 on either side of each membrane 48. In a cutaway portion of FIG. 4, membrane 48 is shown as a totally enclosed liquid film by way of example. The cutaway of the layered construction displays open weave cloth backing 52, 53, silicone encasement films 54, 56 and porous mat 57 impregnated with an aqueous solution saturated with cesium bicarbonate. The cloth backing may be omitted from the high pressure side of the film. One membrane 48 is sandwiched between a pair of separator screens 51 in an alternating arrangement. In addition to acting as separators, screens 51 are combined with flow passages ducting the exhaled gases and sweeping gas through package 49 in counterflow as shown in FIG. 1. Screens 51 may be of the ordinary square-woven variety, the mesh size being selected according to the pressure differences to be encountered. Volumes 62, 63, 64 and 65 are defined by the housing walls and the blunted corners adjacent thereto. Volumes 62 and 64 are in flow communication, but only along the open channels provided by a first set consisting of alternate screens 51 through flow passages 66 opening into these alternate screens at diagonally opposite corners of membrane package 49. Similarly, volumes 63 and 65 are in flow communication, but only along the open channels provided by a second set (the remaining screens 51) consisting of alternate screens 51 through flow passages 67 opening into the remaining alternate screens 51 at the remaining diagonally opposite corners of membrane package 49. This packaged structure and the method for its preparation is described in detail in U.S. application Ser. No. 650,465—Dounoucos, filed June 30, 1967 now U.S. Pat. No. 3,416,985 and assigned to the assignee of the instant application. With the exception of the flow passages referred to above flow communication into the interior of package 48 is prevented by a thin layer 68 of sealing compound covering each peripheral edge entering the openings along the edges of the screens 51 and bonding to membranes 48. Seal 69 along the top and bottom edges can be made to seal against housing 70, or to still another outer layer of silicone rubber on each face.

Exhaled breath in the closed cycle breathing system contains approximately 5 percent $CO_2$, a carbon dioxide content significantly higher than the carbon dioxide content (less than 0.03 percent) that exists in the sweep air. Therefore, by conducting exhaled breath from each respirator 71, 72 to the first set of alternate screens 51 via hose 73, volume 64 and appropriate flow passages (flow passages 66) and, at the same time, conducting the sweep air in counterflow thereto in the second set of alternate screens 51 via pipe 47, volume 65 and appropriate flow passages 67, the membranes 48 respond to the aforementioned concentration gradient by selectively permitting a very large percentage of the $CO_2$ gas to pass through out of the closed cycle breathing system into the sweep air. An insignificant amount of oxygen also passes through the membranes 48 in the same direction at the same time and is lost as the sweep air is exhausted. This minor depletion and the oxygen actually used in respiration are made up, when required, as hereinafter described. Thereafter, exhaled gases of reduced $CO_2$ content leave the first set of alternate screens 51 via volume 62 and conducted to breathing bag 74 via pipe 76, while the sweep gases exit from the second set of alternate screens 51 via volume 63 and are vented through pressure regulator valve 67 in conduit 78, which determines the value of the pressure of the sweep air downstream of throttling means 46.

Closed circuit breathing systems require the inclusion of the flexible volume provided by breathing bag 74 in the circuit in order to allow for expansion and contraction of the lungs of the person wearing the respirators 71, 72 and, as oxygen is consumed thereby, the volume of breathing bag 74 becomes gradually reduced. When a set point in volume senSor 79 is reached, an electrical signal is generated causing demand regulator 81 to open admitting make-up oxygen from the oxygen storage tank 42 to the breathing system until the requisite volume of breathing bag 74 has been restored.

Pressure regulator valve 77 by determining the pressure of the sweep air stream between throttling orifices 46 and valve 77 causes the relative humidity of the sweep air stream to drop from the 100 percent value to the cathode compartments to 70 percent and this control thereby sets the level of moisture content both to humidify the immobilized liquid film and to simultaneously dehumidify the exhaled air stream.

Figure 5:
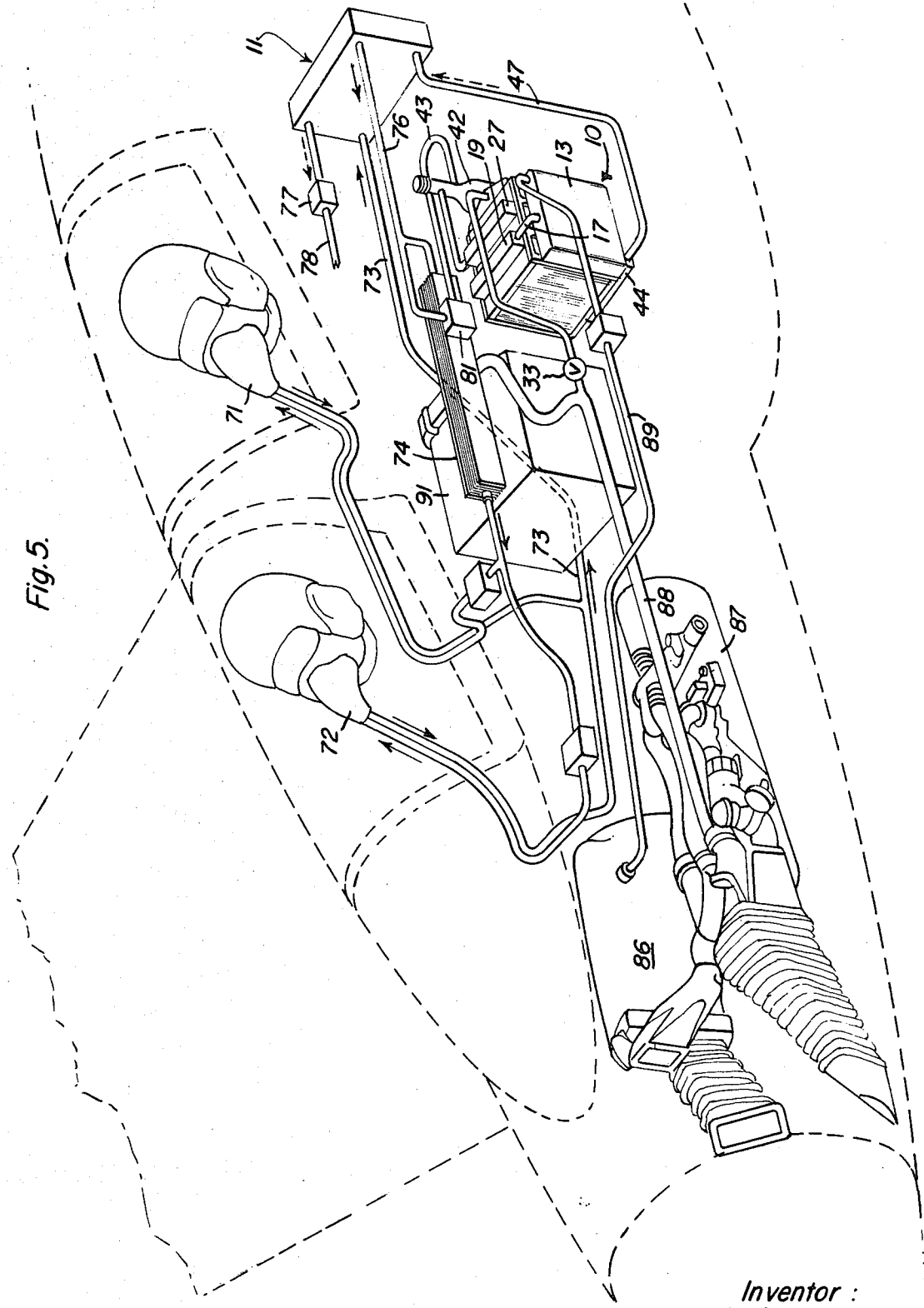
FIG. 5 is a display of one arrangement for the installation of the interdependent components of this invention connected in a fighter aircraft, wherein it has unique application.

One arrangement for integration of the oxygen concentrator/membrane rebreather system of this invention into a fighter aircraft is shown in FIG. 5. Bleed air to be admitted to the humidifier 13 and then to oxygen concentrator 10 is obtained from the cabin air conditioning unit 86 and the air for cooling oxygen concentrator is obtained from the equipment air conditioning unit 87 via conduits 88 and 89. Conduit 88 leads to housing 91 containing equipment, such as electronic gear, which heat generated during operation must be removed. The path of the bleed air as it enters oxygen concentrator 10 and leaves as the sweep gas to scrub membranes 48 in rebreather unit 11 is shown by dotted arrows, while the closed circuit for exhaled breath is shown by solid arrows. The various components have been designated by the same numerals employed in FIGS. 1–4.

Although the use of the following materials for the specific elements recited below is not critical, they are given by way of example:

| | |
|---|---|
| Screens 28 | niobium (anode side) |
| Screens 21 | titanium-palladium (cathode side) |
| Metal wall (backing plate) 29 | niobium |
| Metal wall (backing plate) 31 | titanium-palladium |
| Cooling fins 37 | aluminum |

As has been indicated hereinabove this invention is uniquely applicable to aircraft, both lighter-than-air and heavier-than-air, but it is expected that the compact, relatively light, highly efficient and flexible system disclosed and claimed should have wide application for any closed circuit breathing system where ambient air is available, as for example in hospital rooms, in portable breathing devices, in sealed tanks, ships or other vehicles operating in a hostile, noxious or simply unpleasant environments. Further, this invention is readily adaptable to variations in design employing different pressures and structural arrangements other than those disclosed by way of example. For example, although a respirator worn by each individual segregates intake air (low $CO_2$ content) from exhaled air (high $CO_2$ content) it is to be understood that any confined volume containing all or part of the individual(s) from which closed volume the individual will breathe and to which he will exhale will serve as well in series in the closed circuit, if means for positive circulation of breathing gases through the circuit (closed volume, rebreather unit and breathing bag) is provided.

What I claim as new and desire to secure by Letters Patent of the United States is:

1. In a closed circuit breathinG system for the distribution of oxygen to, and waste gases from, the respiratory organs of a vertebrate, wherein a close volume from which the vertebrate inhales is connected to and is in communication with a container holding a supply of high oxygen content gas, said vertebrate exhaling in the same or a different closed volume, the closed volume which receives the exhaled breath being in communication with an enclosure defined by both impermeable wall area and permeable, non-porous wall area for the conduct of the exhaled breath thereto, said enclosure also being connected to and in communication with said container to complete the closed breathing circuit and said closed circuit being adapted to be selectively placed in communication with a source of high oxygen content gas for the replenishment of oxygen gas used in and lost from said closed circuit breathing system, the improvement comprising:
   a. the permeable, non-porous membrane separating the above-recited enclosure from a second enclosure contiguous therewith,
      1. said permeable, non-porous membrane being of the immobilized liquid film-type and having a ratio of selectivity for gas passage of greater than 1,500:1 for carbon dioxide as compared to oxygen,
   b. a solid electrolyte, ion exchange membrane-type oxygen concentrator in combination with said closed circuit breathing system for the supply of purified oxygen thereto,
   c. means connected between and providing flow communication between said oxygen concentrator and said second enclosure for the conduct of high humidity, low carbon dioxide content exhaust gas under pressure from said oxygen concentrator to said second enclosure to sweep over and scrub the surface of the immobilized liquid membrane and
   d. means interconnecting said oxygen concentrator with the closed circuit breathing system for selectively admitting oxygen gas purified in said oxygen concentrator to the closed circuit breathing system.

2. The improvement substantially as recited in claim 1 wherein the immobilized liquid film is an aqueous solution saturated with cesium bicarbonate and totally enclosed silicone rubber encasement.

3. The improvement substantially as recited in claim 1 wherein the immobilized liquid film is a porous cellulose acetate membrane saturated with an aqueous solution of cesium bicarbonate.

4. In a closed circuit breathing system for the distribution of oxygen to, and waste gases from, the respiratory organs of a vertebrate, wherein a closed volume from which the vertebrate inhales is connected to and is in communication with a container holding a supply of high oxygen content gas, said vertebrate exhaling in the same or a different closed volume, the closed volume which receives the exhaled breath being in communication with an enclosure defined by both impermeable wall area and permeable, non-porous wall area for the conduct of the exhaled breath thereto, said enclosure also being connected to and in communication with said container to complete the closed breathing circuit and said closed circuit being adapted to be selectively placed in communication with a source of high oxygen content gas for the replenishment of oxygen gas used in and lost from said closed circuit breathing system, the improvement comprising:
   a. the permeable, non-porous membrane separating the above-recited enclosure from a second enclosure contiguous therewith,
      1. said permeable, non-porous membrane being of the immobilized aqueous film-type and having a ratio of selectivity for gas passage of greater than 1,500:1 for carbon dioxide as compared to oxygen,
   b. a solid electrolyte, ion exchange membrane-type oxygen concentrator in combination with said closed circuit breathing system for the supply of purified oxygen thereto,
   c. means connected between and providing flow communication between said oxygen concentrator and said second enclosure for the conduct of high humidity, low carbon dioxide content exhaust gas under pressure from said oxygen concentrator to said second enclosure to sweep over and scrub the surface of the immobilized aqueous membrane,
   d. means interconnecting said oxygen concentrator with the closed circuit breathing system for selectively admitting oxygen gas purified in said oxygen concentrator to the closed circuit breathing system and
   e. pressure-reducing means in series with said means for providing flow communication between said oxygen concentrator and said second enclosure whereby a preselected relative humidity of less than 100 percent will be induced in the exhaust gas.

5. The improvement substantially as recited in claim 4 wherein the immobilized aqueous film is saturated with cesium bicarbonate and totally enclosed in silicone rubber encasement.

6. The improvement substantially as recited in claim 4 wherein the immobilized aqueous film is a porous cellulose acetate membrane saturated with an aqueous solution of cesium bicarbonate.

7. In a closed circuit breathing system for the distribution of oxygen to, and waste gases from, the respiratory organs of a vertebrate, wherein a closed volume from which the vertebrate inhales is connected to and is in communication with a container holding a supply of high oxygen content gas, said vertebrate exhaling in the same or a different closed volume, the closed volume which receives the exhaled breath being in communication with an enclosure defined by both impermeable wall area and permeable, non-porous wall area for the conduct of the exhaled breath thereto, said enclosure also being connected to and in communication with said container to complete the closed breathing circuit and said closed circuit being adapted to be selectively placed in communication with a source of high oxygen content gas for the replenishment of oxygen gas used in and lost from said closed circuit breathing system, the improvement comprising:
   a. the permeable, non-porous membrane separating the above-recited enclosure from a second enclosure contiguous therewith,
      1. said permeable, non-porous membrane being of the immobilized aqueous film-type and having a ratio of selectivity for gas passage of greater than 1,500:1 for carbon dioxide as compared to oxygen,
   b. first means in combination with said closed circuit breathing system for simultaneously producing separate streams of high purity oxygen gas and of low carbon dioxide content gas having a relative humidity of about 70 percent,
   c. second means connected between and providing flow communication between said first means and said second enclosure for receiving and conducting the stream of high humidity, low carbon dioxide content exhaust gas from said first means to said second enclosure to sweep over and scrub the surface of the immobilized aqueous membrane and d. third means interconnecting said first means with the closed circuit breathing system for receiving the stream of high purity oxygen gas from said first means and selectively admitting said oxygen gas to the closed circuit breathing system.

8. The improvement substantially as recited in claim 7 wherein the first means is an oxygen concentrator of the type employing ion exchange membrane as the electrolyte medium.

* * * * *